July 7, 1970  G. A. DU ROCHER  3,519,986

DIRECTIONAL SIGNAL SYSTEM FOR VEHICLES

Filed Sept. 6, 1966

INVENTOR
GIDEON A. DuROCHER

BY Robert D. Sommer

AGENT

United States Patent Office 3,519,986
Patented July 7, 1970

3,519,986
DIRECTIONAL SIGNAL SYSTEM FOR VEHICLES
Gideon A. du Rocher, Mount Clemens, Mich., assignor to Essex International, Inc., Fort Wayne, Ind., a corporation of Michigan
Filed Sept. 6, 1966, Ser. No. 577,556
Int. Cl. B60q 1/42
U.S. Cl. 340—55                                                     6 Claims

ABSTRACT OF THE DISCLOSURE

A directional signal system for motor vehicles including right and left signal relays which are selectively energized by a momentary movement of the operating lever of a turn selector control switch to establish either of right and left signal lamp circuits, the circuit selected being cancelled either automatically by a predetermined rotation of the vehicle steering shaft or manually by momentary movement of the operating lever of the turn selector control switch in a direction opposite to its initial signaling movement. The directional signal system may additionally include an emergency warning signal switch to permit simultaneous operation of the right and left signal lamps.

---

Figure 1:
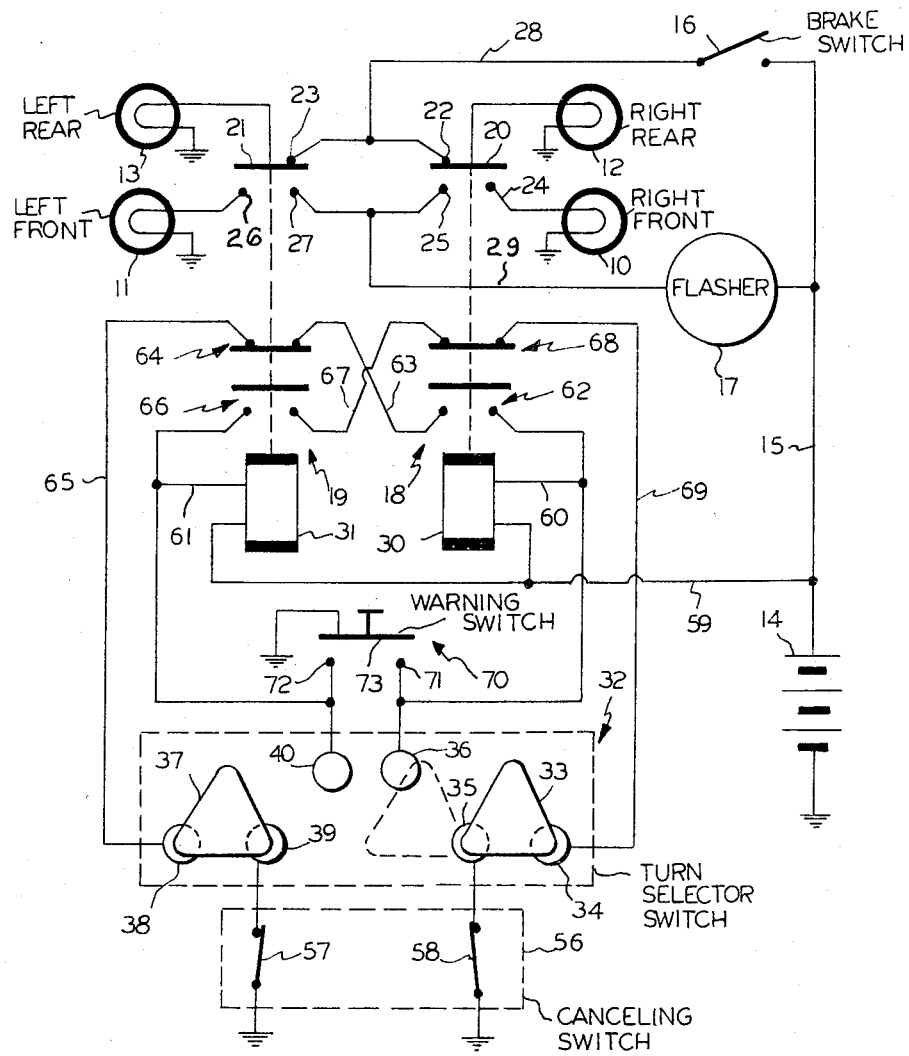

This invention relates to vehicle turn indicating signal systems and more particularly to improvements in the directional signal systems of the type disclosed in my U.S. Pat. No. 2,659,838, issued Nov. 17, 1953.

In my prior U.S. Pat. No. 2,659,838, I have shown and described a directional signal system utilizing two relays connected to selectively energize the right and left turn signal lamps of a vehicle. The turn selector control switch employed in this system is manually operable in three ways, either to selectively energize the relays to actuate the right or left signal lamps or to deenergize the relays to cancel a signal given by the lamps. As the turn selector control lever of the conventional mechanical type directional signal switch mechanism is manually operable in only two ways, it would be desirable to employ in my foregoing electrical turn signal system a turn selector control switch which would be similarly operable in only two ways. Such a control switch not only should be movable from a central position to right and left turn positions on opposite sides of the central position to actuate the right and left signal lamps, but it must also be effective to cancel a previously selected signal by a limited movement in a direction opposite to the initial signaling movement. Moreover, it would be desirable that the control switch be mounted within the vehicle steering column with a more or less conventional switch operating lever extending from the left side of the steering column.

It is therefore an object of the present invention to provide an improved directional signal system of the foregoing character in which the control means include a turn selector control switch operable in two directions from a central position, either to actuate the right or left turn signal lamps or to manually cancel a selected signal.

It is another object of this invention to provide a directional signal system of the foregoing character in which the turn selector control switch is manually operable in the same manner as in conventional mechanical type turn signal systems.

It is a further object of this invention to provide a directional signal system of the foregoing character with which a small and low-cost emergency warning switch may be used to indicate an emergency condition by simultaneously energizing all of the vehicle turn signal lamps.

In the preferred embodiment of the invention, a right turn signal relay and a left turn signal relay are connected to selectively energize right and left turn signal lamps. The relay coils are initially energized through signal control circuits which include the normally open contacts of a turn selector control switch and are then maintained energized by holding circuits which include the normally open holding contacts of the respective relays. The turn selector control switch includes normally closed contacts connected in the holding circuits to deenergize the relays and thus manually cancel a signal when the turn selector switch is operated in a direction opposite to its initial signaling movement. Automatic canceling switch means operable by the vehicle steering shaft is connected to interrupt the holding circuits when the vehicle makes the signaled turn.

Figure 2:
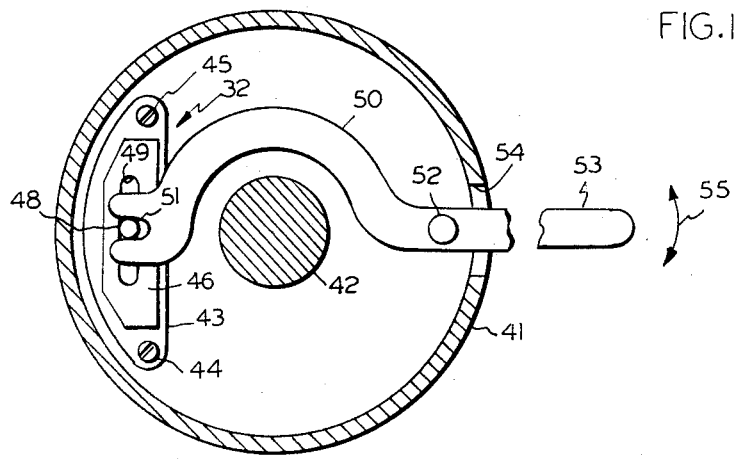

These and other advantages and features of the invention will be made more clear from the following description, taken with the accompanying drawing, in which:

FIG. 1 is a schematic electrical diagram of a directional signal system according to the present invention; and FIG. 2 is a top partial plan view of a turn selector control switch and switch actuator assembled adjacent the steering shaft of a vehicle.

Referring now to the drawing, and more particularly to FIG. 1 thereof, there is shown the circuit diagram of a directional signal system for a motor vehicle having a right front turn signal lamp 10, a left front turn signal lamp 11, a right rear turn and stop signal lamp 12, and a left rear turn and stop signal lamp 13. One filament terminal of each of these lamps is connected to ground. Electrical power for the operation of the signal system is obtained from an electrical power source such as a vehicle storage battery 14 having one terminal grounded by connecting it with the frame of the vehicle. The other terminal of the battery 14 is connected by a conductor 15 to the input terminal of a brake or stop signal switch 16. The battery 14 is also connected by the conductor 15 to a flasher 17 which may be of any desired construction capable of providing repetitive interruption of current flow to a turn signal lamp circuit. The flasher 17 preferably is of the type having a flashing rate which is independent of the lamp load connected to it.

As disclosed in my U.S. Pat. No. 2,659,838, the signal system utilizes a right turn relay 18 and a left turn relay 19 to control the energization of the signal lamps. For this purpose, the relays 18 and 19 have, respectively, movable contact bars 20, 21, normally in engagement with the stationary contacts 22, 23 and two pairs of normally open stationary contacts 24, 25, and 26, 27. The contacts 22 and 23 are each connected by a conductor 28 to the brake switch 16 and the contacts 25 and 27 are each connected by a conductor 29 to the output terminal of the flasher 17. It will be evident that the rear lamps 12 and 13 which are connected to the contact bars 20 and 21, respectively, will normally be energized from the battery 14 whenever the brake switch 16 is closed. If the right relay 18 is energized to move the contact bar 20 away from the contact 22 and into engagement with the contacts 24 and 25, the right signal lamps 10 and 12 will flash on and off as the flasher 17 functions. Energization of the left relay 19 similarly will cause the left signal lamps 11 and 13 to flash on and off.

The energization of the respective coils 30 and 31 of the relays 18 and 19 from the battery 14 is controlled by a manual turn selector control switch 32. A control switch usable with this invention may take a variety of forms, for example, a switch such as disclosed in the U.S. Pat.

No. 2,528,035 of Harold H. Clayton issued Oct. 31, 1950. The control switch 32 is shown in FIG. 1 as comprising a right turn movable contact member 33 operatively associated with the stationary contacts 34, 35, 36, and a left turn movable contact member 37 operatively associated with the stationary contacts 38, 39, 40.

In FIG. 2, the control switch 32 is shown mounted within a housing 41 enclosing the upper end of a steering shaft 42 directly below the vehicle steering wheel (not shown). The base 43 of the switch 32 is secured to the housing 41 by screws 44, 45 and forms one wall of the switch case 46. The actuating pin 48 of an operating selector member in the switch case 46 projects through a lengthwise extending slot 49 and is normally biased by a spring (not shown) to the normal or neutral position shown in FIG. 2. The switch pin 48 is selectively actuated to right or left turn positions on opposite sides of its neutral position by an operating lever assembly 50 having a slot 51 therein for closely receiving the pin 48. The operating lever assembly 50 is pivotally secured within the housing 41 by a pivot pin 52 and has a handle 53 which extends through an aperture 54 in the housing 41 for selective operation in either clockwise or counter-clockwise direction, as indicated by the arrow 55.

When the switch pin 48 is in its center or neutral position as shown in FIG. 2, the contact member 33 connects the contact 34 to the contact 35 and the contact member 37 connects the contact 38 to the contact 39. The movable contact members 33 and 37 are selectively moved from their normal positions shown in FIG. 1 in response to movement of the switch pin 48 from its central position. Thus, if the handle 53 is moved in one direction to signal a right turn, the movable contact member 33 is moved from the solid line position to the dotted line position shown in FIG. 1, first disengaging from the contact 34 and then engaging the contact 36. At the same time, the contact member 37 remains in engagement with the contacts 38 and 39. Similarly, when the handle 53 is pivoted in the other direction to signal a left turn, the movable contact member 37 disengages from the contact 38 and then engages the contact 40 while the contact member 33 remains in its normal position. Upon release of the handle 53, the spring biased pin 48 returns to its normal central position in the slot 49 and the normal position of the contact members 33 and 37 is restored.

The directional signal system of this invention also includes an automatic canceling switch means 56 to automatically cancel a turn indication when the turn is completed. The canceling switch means may be of a well-known construction comprising two normally closed switches 57 and 58 operated by the steering mechanism of the vehicle. The right turn canceling switch 57 is adapted to be momentarily opened upon return of the vehicle steering mechanism to a straight-ahead course position after completion of a right turn. Similarly, the left turn canceling switch 58 is adapted to be momentarily opened upon return of the steering mechanism to a straight-ahead course position after completion of a left turn.

The relay coils 30 and 31 are each connected at one end to the battery 14 by the conductor 59. The other ends of the coils 30 and 31, respectively, are connected by the conductors 60 and 61 to the contacts 36, and 40 of the control switch 32. The coil 30 is also connected to the contact 38 of the control switch 32 by means of the conductor 60, the normally open holding contacts 62 of the relay 18 conductor 63, the normally closed interlock contacts 64 of the relay 19, and the conductor 65. The coil 31 is similarly connected to the contact 34 of the control switch 32 by means of the conductor 61, the normally open holding contacts 66 of the relay 19; conductor 67, the normally closed interlock contacts 68 of the relay 18, and the conductor 69.

Upon the vehicle driver desiring to signal a right turn, the handle 53 is rotated to cause movement of the movable contact member 33 into engagement with the contact 36 of the control switch 32. This movement completes a right signal initiating or control circuit extending from the battery 14 through the conductor 59, coil 30, conductor 60, contact 36, contact member 33, contact 35, and canceling switch 58 to ground. This circuit energizes the relay coil 30 causing the holding contacts 62 to close, the interlock contacts 68 to open, and the contact bar 20 to engage the contacts 24 and 25. The closing of the holding contacts 62 completes a holding circuit for the coil 30 which extends from the battery 14 through the conductor 59, coil 30, conductor 60, contacts 62, conductor 63, contacts 64, conductor 65, contact 38, contact member 37, contact 39, and canceling switch 57 to ground. Thus, the coil 30 will be maintained energized when the handle 53 is released and the contact member 33 returns to its normal position. An intermittent current will be supplied from the battery 14 through the flasher 17, the contact 25, the contact bar 20, and the contact 24 to the right signal lamps 10 and 12. The left signal lamps will not flash, however, although it will be possible to energize the left rear signal lamp 13 by closing the brake switch 16. The signal lamps 10 and 12 will continue to flash until the canceling switch 57 is momentarily opened upon completion of the right turn. The opening of the canceling switch 57 interrupts the right holding circuit thereby deenergizing the relay coil 30. The turn signal system is now restored to its normal condition and is ready for another signaling operation.

It will be appreciated that a left turn signal indication is accomplished in a similar manner by momentarily moving the handle 53 in an opposite direction to energize the relay coil 31.

In the event that the vehicle driver desires to cancel either a right or left turn signal indication and return the system to its normal condition without executing the signaled turn, this cancellation may be accomplished by moving the handle 53 part way or to a small extent in the direction opposite to the initial signaling direction. Thus, if a right signal is initiated, such movement of the handle 53 would disengage the movable contact member 37 from the contact 38 to interrupt the right holding circuit without engagement of the contact member 37 with the contact 40.

It will be appreciated that if the vehicle driver desires to change either a right or left turn signal indication to the opposite signal indication, the change may be accomplished by moving the handle 53 fully in the direction opposite to the initial signaling direction. If, for instance, a right turn signal has been initiated as described above and it is desired to change to a left turn signal, a full movement of the handle 53 in a direction to select a left turn signal will disengage the movable contact member 37 from the contact 38 to interrupt the right holding circuit of the relay coil 30. As the movable contact member 37 then engages the contact 40, the coil 31 of the left turn relay 19 is energized. The coil 31 is maintained energized through the holding contacts 66 although the movable contact member 37 returns to its normal position upon release of the handle 53.

From the foregoing description, it will be seen that a simple and efficient turn indicating system has been provided which is extremely flexible in operation. Both signal initiation and cancellation may be effected freely by means of a signal operating lever assembly requiring only light operating forces. Moreover, the turn selector control switch may be mounted within the steering shaft housing with a conventional actuating lever located at the left side of the housing and manually operable with the same movements required by the conventional mechanical type of directional signal switches. If desired, the turn selector switch may, of course, be installed in other locations remote from the steering wheel.

Another advantage offered by the directional signal system of this invention is the simplicity and economy with which the system may be adapted to provide simultaneous operation of all four signal lamps 10, 11, 12, 13 as an emergency warning signal. Such a warning signal is desired when a vehicle makes an emergency stop on the road for reasons of engine trouble, tire repair and the like which require that adequate warning of the stopped vehicle be given to approaching vehicles. As shown in FIG. 1, the signal system of this invention may be provided with a hazard warning switch 70 having two stationary contacts 71 and 72 which are operatively associated with a movable contact member 73. The movable contact member 73 which is connected to ground is manually movable from a normally open or inactive position shown in FIG. 1 to a second or active position in which it bridges the contacts 71, 72. The contacts 71 and 72, respectively, are connected by extensions of the conductors 60 and 61 to the turn relay coils 30 and 31. It will be apparent that when the movable contact member 73 is moved to its active position the relay coils 30 and 31 will be simultaneously energized whereupon a circuit will be completed from the battery 14 through the flasher 17 to all four of the signal lamps. Thus, all of the signal lamps are caused to flash simultaneously to provide an adequate warning of the hazard condition. Those skilled in the art will appreciate that the single pole, double break warning switch 70 may be a low cost switch of small size which may be conveniently mounted within the limited space available in the steering shaft housing 48.

While the invention has been illustrated and described in its preferred embodiment and has included certain details, it should be understood that the invention is not to be limited to the precise deails herein illustrated and described since the same can be carried out in other ways falling within the scope of the invention as claimed.

What is claimed is:

1. In a vehicle signal system which includes
   an electrical power source;
   right and left signal lamp circuits;
   a right turn signal relay having normally open contact means which, when closed, connect said right signal lamp circuit to said source;
   a left turn signal relay having normally open contact means which, when closed, connect said left signal lamp circuit to said source;
   each of said relays including a coil and normally open holding contacts;
   a control switch having a manually operable selector member movable from a neutral position to right and left turn positions on opposite sides of said neutral position, said control switch having right and left normally open switch means selectively closed by movement of the selector member to said right and left turn positions, respectively;
   a right signal control circuit including said right normally open switch means, when closed, connecting the coil of said right turn relay to said source;
   a left signal control circuit including said left normally open switch means, when closed, connecting the coil of said left turn relay to said source;
   a right signal holding circuit including the holding contacts of said right turn relay, when closed, connecting the coil of said right turn relay to said source independently of said right normally open switch means;
   a left signal holding circuit including the holding contacts of said left turn relay, when closed, connecting the coil of said left turn relay to said source independently of said left normally open switch means;
   the combination therewith of right and left normally closed switch means independent of said relays, selectively opened by movement of said selector member to said right and left positions, respectively;
   said right normally closed switch means being connected in said left holding circuit and said left normally closed switch means being connected in said right holding circuit to interrupt flow of current through their respective holding circuits, when open, whereby manual operation of said selector member to provide one turn signal indication automatically cancels an opposite turn signal indication.

2. In a vehicle signal system, the combination as claimed in claim 1 wherein
   said right and left normally closed switch means of said control switch are adapted when selectively actuated by said selector member to open prior to closing of said respective right and left normally open switch means:
   said selector member when selectively actuated a limited degree from said neutral position in either of said directions opening the respective one of said normally closed switch means without closing the corresponding one of said normally open switch means whereby said selector member may be operated a limited degree to interrupt a previously energized one of said holding circuits without causing energization of the opposite control circuit for manual cancellation of a selected turn signal indication.

3. In a vehicle signal system, the combination as claimed in claim 1 including
   normally closed canceling switch means actuated by steering shaft rotation,
   said canceling switch means being connected in said right and left holding circuits to interrupt flow of current through the respective holding circuits when the vehicle makes the signaled turn.

4. In a vehicle signal system, the combination as claimed in claim 1 wherein
   said right signal lamp circuit includes right front and right rear signal lamps and said left signal lamp circuit includes left front and left rear signal lamps;
   a circuit interrupting flasher switch connected between said normally open contact means of said right and left relays and said power source for repetitively interrupting the current flow to the lamps selected by either one of said relays to provide a flashing turn signal indication;
   a manually operable warning switch having contacts connected between said power source and said relay coils and adapted when actuated to simultaneously energize both of said relay coils for causing all of said right and left signal lamps to be repetitively energized and simultaneously flashed to indicate a hazard condition of the vehicle.

5. In a vehicle signal system, the combination as claimed in claim 1 wherein
   said right signal lamp circuit includes right front and right rear signal lamps;
   said left signal lamp circuit includes left front and left rear signal lamps;
   a circuit interrupting flasher switch connected between said normally open contact means of said right and left relays and said power source for repetitively interrupting the current flow to the lamps selected by either one of said relays to provide a flashing turn signal indication;
   each of said right and left relays including additional normally closed contact means operatively associated with said normally open contact means to be selectively opened upon closing of the respective one of said normally open contact means;
   a normally open brake switch closed in response to operation of the vehicle brake;
   a stop light energizing circuit for each of said right and left rear signal lamps including said brake switch, when closed, and the respective one of said normally closed contact means;
   right and left turn normally closed cancelling switches actuated by steering shaft rotation and momentarily opened, respectively, while said vehicle steering shaft is rotating to complete right and left turns;
   said right and left canceling switches being connected, respectively, in said right and left holding circuits to interrupt flow of current through the respective holding circiuts when the vehicle makes the signaled turn;

said right and left normally closed switch means of said control switch being adapted when selectively actuated by said selector member to open prior to closing of said respective right and left normally open switch means;

said selector member when selectively actuated a limited degree from said neutral position in either of said directions opening the respective one of said normally closed switch means without closing the corresponding one of said normally open switch means whereby said selector member may be operated a limited degree to interrupt a previously energized one of said holding circuits without causing energization of the opposite control circuit for manual cancellation of a selected turn signal indication.

6. In a vehicle signal system, the combination as claimed in claim 5 including a manually operable warning switch having contacts connected between said power source and said relay coils and adapted when actuated to simultaneously energize both of said relay coils for causing all of said right and left signal lamps to be repetitively energized and simultaneously flashed to indicate a hazard condition of the vehicle.

References Cited

UNITED STATES PATENTS

| | | | |
|---|---|---|---|
| 2,659,838 | 11/1953 | Du Rocher | 340—55 |
| 3,333,241 | 7/1967 | Peterson | 340—55 |

THOMAS B. HABECKER, Primary Examiner

H. S. COHEN, Assistant Examiner

U.S. Cl. X.R.

340—70